US012792666B2

(12) United States Patent
Wang et al.

(10) Patent No.: US 12,792,666 B2
(45) Date of Patent: Nov. 10, 2026

(54) ENTITY LINKING USING SUBGRAPH MATCHING

(71) Applicant: Visa International Service Association, San Francisco, CA (US)

(72) Inventors: Sheng Wang, Austin, TX (US); Xutong Wang, Austin, TX (US); Jie Yuan, San Mateo, CA (US); Peng Wu, Beaverton, OR (US); Dan Wang, Cedar Park, TX (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 19/115,996

(22) PCT Filed: Sep. 25, 2023

(86) PCT No.: PCT/US2023/075006
§ 371 (c)(1),
(2) Date: Mar. 27, 2025

(87) PCT Pub. No.: WO2024/073338
PCT Pub. Date: Apr. 4, 2024

(65) Prior Publication Data

US 2026/0099545 A1 Apr. 9, 2026

Related U.S. Application Data

(60) Provisional application No. 63/377,662, filed on Sep. 29, 2022.

(51) Int. Cl.
*G06F 16/901* (2019.01)
*G06F 16/906* (2019.01)
*G06N 3/09* (2023.01)

(52) U.S. Cl.
CPC ........ *G06F 16/9024* (2019.01); *G06F 16/906* (2019.01); *G06N 3/09* (2023.01)

(58) Field of Classification Search
CPC ...... G06F 16/9024; G06F 16/906; G06N 3/09
See application file for complete search history.

(56) References Cited

U.S. PATENT DOCUMENTS

2021/0182659 A1 6/2021 Makhija et al.
2021/0319785 A1* 10/2021 Tandecki ................ G10L 15/16
(Continued)

FOREIGN PATENT DOCUMENTS

CN 110245238 A 9/2019
CN 112100324 A 12/2020
(Continued)

OTHER PUBLICATIONS

Hu et al., Answering Natural Language Questions by Subgraph Matching over Knowledge Graphs, IEEE Transactions on Knowledge and Data Engineering, Oct. 2017, pp. 1-14.
(Continued)

*Primary Examiner* — Dangelino N Gortayo
(74) *Attorney, Agent, or Firm* — K&L Gates LLP

(57) ABSTRACT

Systems and methods for entity linking using a graph neural network are disclosed. In one aspect, a method for entity linking can include extracting a first attribute set of an unknown entity from an information source and retrieving second attribute sets of known entities from a database, wherein each of the second attribute sets corresponds to one of the known entities. The method can further include generating an unknown entity graph based on the first attribute set, generating known entity graphs based on the second attribute sets, generating an unknown entity graph embedding by applying the unknown entity graph to a graph neural network, and generating known entity graph embed-
(Continued)

dings by applying the known entity graphs to the graph neural network. The method can further include assigning the information source to one of the known entities based on the unknown entity graph embedding and the known entity graph embeddings.

20 Claims, 9 Drawing Sheets

(56) References Cited

U.S. PATENT DOCUMENTS

| | | | | |
|---|---|---|---|---|
| 2022/0100720 | A1* | 3/2022 | Dhama | G06N 3/09 |
| 2022/0207343 | A1* | 6/2022 | Lei | G06F 16/24526 |
| 2022/0284309 | A1 | 9/2022 | Kim | |
| 2022/0358395 | A1* | 11/2022 | McCreary | G06N 20/00 |
| 2023/0022673 | A1* | 1/2023 | Derzsy | G06F 40/30 |

FOREIGN PATENT DOCUMENTS

| | | | |
|---|---|---|---|
| CN | 112765362 | A | 5/2021 |
| WO | 2024073338 | A1 | 4/2024 |

OTHER PUBLICATIONS

International Search Report and Written Opinion for corresponding International Application No. PCT/US2023/075006 mailed Jan. 9, 2024.

* cited by examiner

ENTITY LINKING USING SUBGRAPH MATCHING

CROSS-REFERENCE TO RELATED APPLICATIONS

This application is a U.S. National Stage Entry under 35 U.S.C. § 371 of International Patent Application No. PCT/US2023/075006, entitled "ENTITY LINKING USING SUBGRAPH MATCHING", filed Sep. 25, 2023, which claims the benefit of and priority under 35 U.S.C. § 119 (e) to U.S. Provisional Application Ser. No. 63/377,662, filed Sep. 29, 2022, entitled "ENTITY LINKING USING A GRAPH NEURAL NETWORK," the contents of which are hereby incorporated by reference in their entireties herein.

TECHNICAL FIELD

At least some aspects of the present disclosure relate to entity linking, such as entity linking using subgraph matching and natural langue processing.

BACKGROUND

In the field of natural language processing (NLP), entity linking, which is sometimes referred to as named-entity linking or named-entity matching, generally relates to determining that a word or string of words recited in text refers to a particular entity. Thus, entity linking can involve assigning a unique identity to a word or string of words. In many cases, the unique identity can be an individual or an organization, such as a company, a foundation, a charitable organization, or a governmental organization.

Entity linking can be a valuable tool for associating information with a particular individual or organization. In some aspects, this is because entity linking can enable companies to leverage the vast amount of information accessible via the Internet to evaluate other entities. For example, various private and public information sources such as news articles, wikis, social media, and other databases and publications may contain information related to an entity. This information may be relevant to evaluating the entity's creditworthiness, evaluating the risk of doing business with the entity, evaluating the financial performance of the entity, etc. However, because there are potentially millions of information sources and potentially thousands or even millions of entities that the evaluating company is interested in, it can be difficult to manually identify information that may be relevant. Accordingly, NLP and entity linking can be used as an automated way of identifying particular entities mentioned in these information sources and/or determining that a particular information source, such as a news article, is about a particular entity.

Nevertheless, several challenges exist related to entity linking. As one example, there is often ambiguity and inconsistency in the names used to refer to a particular entity. A news article about an entity with the legal name "United Airlines, Inc." may instead recite the name "United" within the text or even the title of the article. Therefore, a computer-implemented process may mistake the name "United" for other entities such as "United Health Care" and "United Technology Corp.," for example.

Moreover, even if a name mentioned in an information source is correctly linked to a particular entity, it can be difficult for a computer-implemented process to determine whether the information source is primarily providing information about that particular entity. For example, an online news article may report on various operational issues that a company is encountering. In addition to reciting the name of the company, the article also may recite multiple other entity names related to the company, such as subsidiary company names, parent company names, customer names, supplier names, names of officers of the company, etc. Although, a computer-implemented process may be able to link these names to unique entities, the computer-implemented process may not be able to reliably determine which of the unique entities is encountering the operational issues reported by the article.

Some methods of entity linking employ string similarity matching techniques. These string similarity matching techniques typically involve generating a string similarity score (e.g., Hamming distance, Jaro-Winkler distance) by comparing the string of characters in the name of an entity extracted from an information source (e.g., an unknown name) to the string of characters in the names of entities stored in a database (e.g., known names). The unknown name is then assigned to the known name with which it has the highest string similarity score. For example, an unknown name may be extracted from the title of a news article. Using a string similarity matching technique, the unknown name can be linked to a known name stored in a database. Thus, based on the name in the title of the article, it may be determined that the article is about a particular entity.

String similarity matching techniques, however, can be problematic when used for linking an information source to a particular entity. In some aspects, this may be problematic because some information sources do not have a title from which an entity name can be extracted. In other aspects, this may be problematic because some information sources may not include an entity name in their title. In yet other aspects, this may be problematic because string similarity matching techniques are sensitive to data quality and often fail to account for the underlying relationships of the entity names. For example, using metrics for calculating string similarity known to those skilled in the art, an unknown entity name "China Eastern Airlines Yunnan Company" recited in the title of a news article may have a string similarity score of 0.70 with "China Airlines," a string similarity score of 0.75 with "China Eastern Air," and a string similarity score of 0.76 with "China Yunnan Hotel Corp." Thus, a string similarity matching technique may incorrectly determine that the article is providing information about "China Yunnan Hotel Corp."

Accordingly, there is a need for systems and methods that are able to perform entity linking automatically, accurately, and efficiently. The present disclosure provides solutions that perform entity linking using subgraph matching techniques.

SUMMARY

In one aspect, the present disclosure provides a computer-implemented method for entity linking. The method can include extracting, by an extraction module, a first attribute set from an information source and retrieving, by the extraction module, a second attribute set from a database comprising known entities. The first attribute set corresponds to an unknown entity and comprises first attributes. The second attribute set corresponds to one of the known entities and comprises second attributes. The method can further include generating, by a graph generation module, an unknown entity graph and a known entity graph. The unknown entity graph comprises first nodes corresponding to the first attributes and the known entity graph comprises a second nodes corresponding to the second attributes. The method can further include generating, by a graph neural network model, an unknown entity graph embedding by applying the unknown entity graph to the graph neural network model, generating, by the graph neural network model, a known entity graph embedding by applying the known entity graph to the graph neural network model, and generating, by an embedding similarity module, an embedding space similarity score based on the unknown entity graph embedding and the known entity graph embedding. The information source is assigned, by a recommendation module, to one of the known entities based on the embedding space similarity score.

In one aspect, the present disclosure provides a computer-implemented method for entity linking. The method can include extracting, by an extraction module, a first attribute set from an information source and retrieving, by the extraction module, a second attribute set from a database comprising known entities. The first attribute set corresponds to an unknown entity and comprises first attributes. The second attribute set corresponds to one of the known entities and comprises second attributes. The method can further include generating, by a graph generation module, an unknown entity graph and a known entity graph. The unknown entity graph comprises first nodes corresponding to the first attributes and the known entity graph comprises second nodes corresponding to the second attributes. The method can further include generating, by a graph neural network model, an unknown entity graph embedding by applying the unknown entity graph to the graph neural network model, generating, by the graph neural network model, a known entity graph embedding by applying the known entity graph to the graph neural network model, and generating, by an embedding similarity module, an embedding space similarity score based on the unknown entity graph embedding and the known entity graph embedding.

The above method can further include identifying, by a string similarity module, attribute pairs and generating, by the string similarity module, string similarity scores corresponding to the attribute pairs. Each of the attribute pairs comprises one of the first attributes and a corresponding one of the second attributes. Each of the string similarity scores is based on one of the attribute pairs. The method can further include determining, by a recommendation module, an overall similarity score based on the embedding space similarity score and the string similarity scores. The information source is assigned, by the recommendation module, to one of the known entities based on the overall similarity score.

In one aspect, the present disclosure provides an entity linking system. The entity linking system can include a graph generation module, a graph neural network, an embedding space similarity module, and a recommendation module. The graph generation module can be configured to generate an unknown entity graph and a known entity graph. The unknown entity graph is based on a first attribute set comprising first attributes, wherein the first attributes are extracted from an information source, wherein the first attribute set corresponds to an unknown entity, and wherein the unknown entity graph comprises first nodes corresponding to the first attributes. The known entity graph is based on a second attribute set comprising second attributes, wherein the second attributes are retrieved from a database comprising known entities, wherein the second attribute set corresponds to one of the known entities, and wherein the known entity graph comprises second nodes corresponding to the second attributes. The graph neural network can be configured to generate an unknown entity graph embedding based on the unknown entity graph and a known entity graph embedding based on the known entity graph. The embedding space similarity module can be configured to generate an embedding space similarity score based on the unknown entity graph embedding and the known entity graph embedding. The recommendation module can be configured to assign the information source to one of the known entities based on the embedding space similarity score.

FIGURES

Various features of the embodiments described herein, together with advantages thereof, may be understood in accordance with the following description taken in conjunction with the accompanying drawings as follows.

Figure 1:
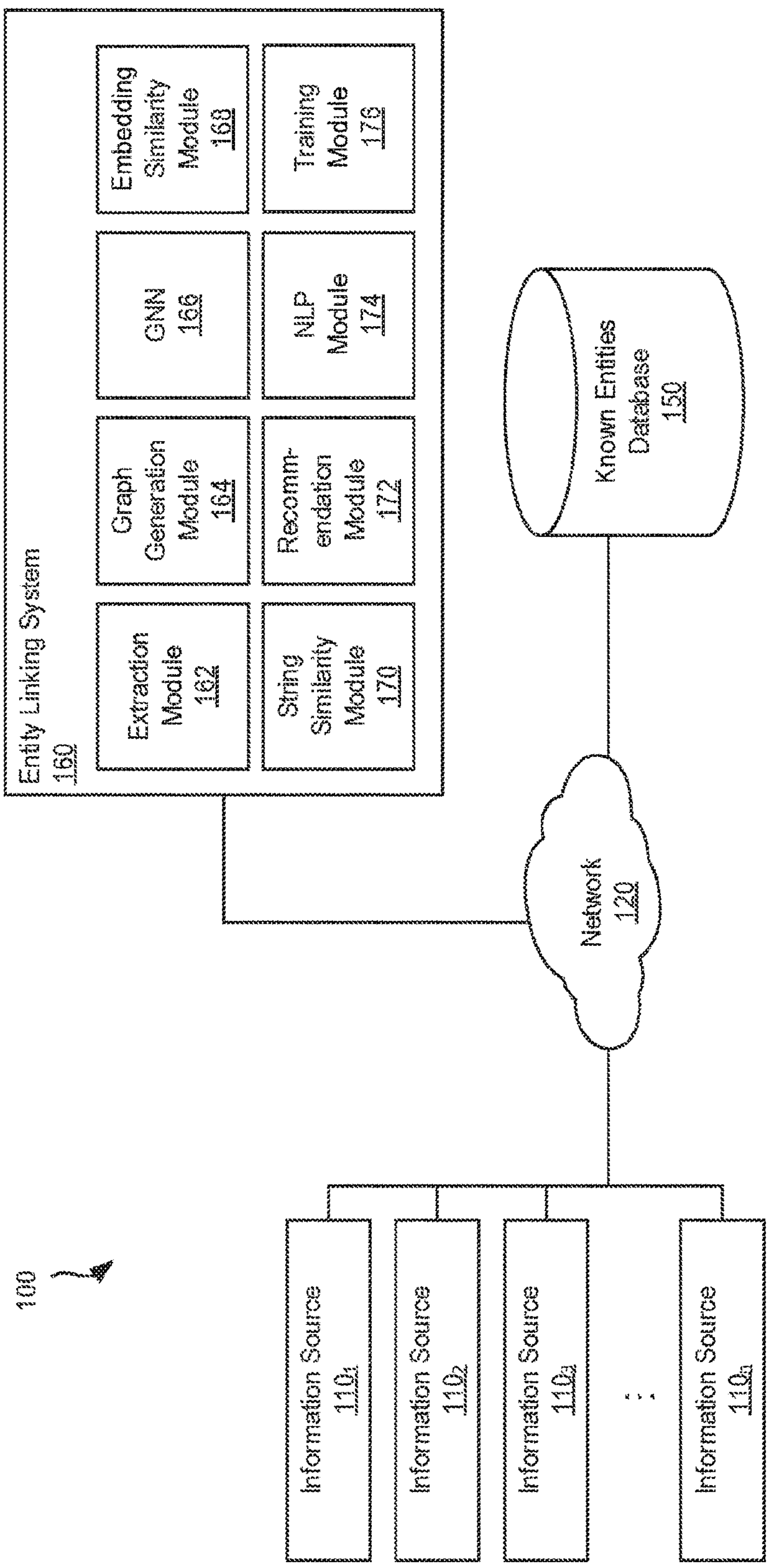
FIG. 1 is a diagram illustrating an entity linking system, according to at least one aspect of the present disclosure.

Corresponding reference characters indicate corresponding parts throughout the several views. The exemplifications set out herein illustrate various aspects of the present disclosure, in one form, and such exemplifications are not to be construed as limiting the scope of the disclosure in any manner.

DESCRIPTION

Applicant of the present application owns the following International Patent Application, the disclosure which is herein incorporated by reference in its entirety:

International Patent Application No. PCT/US2022/077290, titled ENTITY LINKING USING A GRAPH NEURAL NETWORK, filed Sep. 29, 2022.

Before explaining various forms of entity linking using subgraph matching, it should be noted that the illustrative forms disclosed herein are not limited in application or use to the details of construction and arrangement of components illustrated in the accompanying drawings and description. The illustrative forms may be implemented or incorporated in other forms, variations and modifications, and may be practiced or carried out in various ways. Further, unless otherwise indicated, the terms and expressions utilized herein have been chosen for the purpose of describing the illustrative forms for the convenience of the reader and are not for the purpose of limitation thereof.

As used herein, the term "computing device" or "computer device" may refer to one or more electronic devices that are configured to directly or indirectly communicate with or over one or more networks. A computing device may be a mobile device, a desktop computer, and/or the like. Furthermore, the term "computer" may refer to any computing device that includes the necessary components to send, receive, process, and/or output data, and normally includes a display device, a processor, a memory, an input device, a network interface, and/or the like.

As used herein, the term "server" may include one or more computing devices which can be individual, stand-alone machines located at the same or different locations, may be owned or operated by the same or different entities, and may further be one or more clusters of distributed computers or "virtual" machines housed within a datacenter. It should be understood and appreciated by a person of skill in the art that functions performed by one "server" can be spread across multiple disparate computing devices for various reasons. As used herein, a "server" is intended to refer to all such scenarios and should not be construed or limited to one specific configuration. The term "server" may also refer to or include one or more processors or computers, storage devices, or similar computer arrangements that are operated by or facilitate communication and processing for multiple parties in a network environment, such as the Internet, although it will be appreciated that communication may be facilitated over one or more public or private network environments and that various other arrangements are possible. Further, multiple computers, e.g., servers, or other computerized devices, directly or indirectly communicating in the network environment may constitute a "system." Reference to "a server" or "a processor," as used herein, may refer to a previously-recited server and/or processor that is recited as performing a step or function, a different server and/or processor, and/or a combination of servers and/or processors.

As used herein, the term "system" may refer to one or more computing devices or combinations of computing devices (e.g., processors, servers, client devices, software applications, modules, components of such, and/or the like). For example, a system may include a plurality of computing devices that include software applications, where the plurality of computing devices are connected via a network.

As used herein, the term "module" can refer to a computer-related entity, either hardware, a combination of hardware and software, software, or software in execution.

As used herein, the term "entity" may refer to or include an individual, a company, a business-related organization, a non-profit organization, a governmental organization, a charitable organization, an educational institution, or any other type of individual, group of individuals, or organization.

As used herein, the term "word" may refer to a string of character(s). For example, a word may refer to a string of character(s) that are not separated by a space. The string of character(s) can include one or more characters. The one or more characters can include letter(s), number(s), and/or symbol(s).

As used herein, the term "name" can refer to a word or a string of words. For example, a name can be a word or a string of words which refer to an entity.

As used herein, the term "known," when used to refer to a name and/or an entity (e.g., a known name, a known entity name, a known entity) can mean that the name and/or entity has been designated or otherwise associated with a particular unique entity. For example, a database storing a set of known names may be used to designate each of the known names as referring to a particular entity.

As used herein, the term "unknown," when used to refer to a name and/or an entity (e.g., an unknown name, an unknown entity name, an unknown entity), can mean any name and/or entity that is mentioned or otherwise described in an information source. The unknown name, unknown entity name, and/or an unknown entity may or may not have been assigned to a known name or a known entity. As one example, a name that is the target of an entity linking process for assigning the name to a particular known entity and/or a particular known name can be referred to as an unknown name. As another example, a name may have been extracted from an information source and assigned to a known name via an entity linking process. The name may still be referred to as an unknown name even though it has been assigned to a known name. Likewise, the entity described by the name may still be referred to as an unknown entity.

As used herein, an "attribute" of an entity or an "entity attribute" can refer to any type of information that may be used to characterize and/or describe an entity. For example, attributes of an entity can include a name or names (e.g., legal name, stock symbol, d.b.a., alias, nickname), biographical information, organizational information (e.g., state of registration, legal entity type such as a corporation, LLC, LLP, non-profit, etc.), financial information, industry classification(s), industry segment classification(s), parent company information, subsidiary company information, competitor information, customer information, vendor information, personnel information (e.g., number of employees, names of officers, names of board members), and/or geographic information (e.g., headquarters location, office locations, market locations, other locations at which the entity is known to conduct business).

Entity linking is fundamental for any organization to effectively leverage data that is external to the organization. Leveraging external data by an organization is technically quite challenging given the heterogeneous nature of data and the ambient quality of the external data. In accordance with the present disclosure, machine learning is employed to effectively leverage external data. In one aspect, as described in more detail hereinbelow, machine learning techniques are employed to extract structural information from an external name entity based on a variety of factors such as geography, industry, among others. In one aspect, the machine learning techniques include a machine learning model to learn when a matched link should be or should not be in an embedding space. The following description provides a technical solution for leveraging external data by an organization.

The present disclosure provides solutions that can perform entity linking using subgraph matching, such as assigning an information source (e.g., an online news article) to a particular known entity using subgraph matching. Performing entity linking using subgraph matching can provide various technological benefits. For example, the systems and methods disclosed herein can allow a computer to more accurately and efficiently perform entity linking, in a non-routine way, by (i) extracting, by an extraction module, a first attribute set from an information source, wherein the first attribute set corresponds to an unknown entity and comprises first attributes, (ii) retrieving, by the extraction module, a second attribute set from a database comprising information related to known entities, wherein second attribute set corresponds to one of the known entities and comprises second attributes, (iii) generating, by a graph generation module, an unknown entity graph comprising first nodes corresponding to the first attributes, (iv), generating, by the graph generation module, a known entity graph comprising second nodes corresponding to the second attributes, (v) generating an unknown entity graph embedding by applying the unknown entity graph to a graph neural network model, (vi) generating a known entity graph embedding by applying the known entity graph to the graph neural network model, (vii) generating, by an embedding similarity module, an embedding space similarity score based on the unknown entity graph embedding and the known entity graph embedding, and (viii) assigning, by a recommendation module, the information source to one of the known entities based on the embedding space similarity score.

As another example, the systems and methods disclosed herein can allow a computer to more accurately and efficiently perform entity linking, in a non-routine way by, in addition to elements (i)-(vii) above, (ix) identifying, by a string similarity module, attribute pairs, wherein each of the attribute pairs comprises one of the first attributes and a corresponding one of the second attributes, (x) generating, by the string similarity module, string similarity scores, wherein each of the string similarity scores correspond to one of the attribute pairs, (xi) determining, by a recommendation module, an overall similarity score based on the embedding space similarity score and the string similarity scores, and (xii) assigning, by the recommendation module, the information source to one of the known entities based on the overall similarity score.

Moreover, the system and methods disclosed herein integrate elements (i)-(vii) and (i)-(xi) above into a practical application by (viii) assigning the information source to one of the known entities based on the embedding space similarity score and/or (xii) assigning the information source to one of the known entities based on the overall similarity score.

Further, the systems and methods disclosed herein can allow one or more of the potentially millions of various private and/or public information sources providing information about a particular entity (e.g., news articles, wikis, social media, online databases) to be automatically assigned to that particular entity, thereby performing entity linking at a scale that cannot be practically performed in the human mind.

FIG. 1 is a diagram 100 illustrating an entity linking system 160, according to at least one non-limiting aspect of the present disclosure. The entity linking system 160 can include various modules such as an extraction module 162, a graph generation module 164, a graph neural network 166 (GNN), an embedding similarity module 168, a string similarity module 170, a recommendation module 172, a natural language processing (NLP) module 174, and/or a training module 176. Although the modules of the entity linking system 160 are described below as separately performing various functions, any of the modules can be configured to perform any combination of the functions described herein. Likewise, multiple modules may be combined into a single module to perform any combination of the functions described herein and/or a single module may be split into multiple submodules with each of the submodules performing any of the functions described herein.

The entity linking system 160 is configured to access or otherwise communicate with information sources $\mathbf{110}_1$, $\mathbf{110}_2$, $\mathbf{110}_3$, . . . $\mathbf{110}_n$ (collectively information sources 110) via a network 120. The network 120 can include any variety of wired, long-range wireless, and/or short-range wireless networks. For example, the network 120 can include an internal network, a Local Area Network (LAN), Wi-Fi, a cellular network, a private network, the Internet, a cloud computing network, and/or a combination of these or other types of networks. The information sources 110 can include any type and combination of information sources that include text-based data, image data, video data, and/or other multimedia-based data accessible via the network 120. For example, the information sources 110 can include various private and public information sources such as news articles, wikis, social media, and/or other databases and publications accessible via the network 120, such as, for example, the Internet.

The entity linking system 160 is further configured to access or otherwise communicate with a known entities database 150 via the network 120. In the non-limiting aspect of FIG. 1, known entities database 150 is separate from the entity linking system 160. In other aspects, the known entities database 150 can be included as part of the entity linking system 160 (e.g., stored on the same server or combination of servers as the entity linking system 160). The known entities database 150 can include data related to a plurality of known entities. For example, the known entities database 150 can include a list of the names of known entities. As another example, the known entities database 150 can include various attributes of each of the known entities such as entity name(s), biographical information, organizational information, financial information, industry classification(s), industry segment classification(s), parent company information, subsidiary company information, competitor information, customer information, vendor information, personnel information, and/or geographic information.

The extraction module 162 of the entity linking system 160 can be configured to extract information from the information sources 110 and/or the known entities database 150. For example, in one aspect, the extraction module 162 can be configured to detect, classify, and/or extract attributes related to unknown entities from text, image(s), video, and/or any other type of multimedia data included in the information sources 110. The entity attributes extracted from the information sources 110 can be similar to the type of entity attributes stored in the known entities database. For example, the extraction module 162 can be configured to extract, from the information sources 110, attributes such as entity name(s), biographical information, organizational information, financial information, industry classification(s), industry segment classification(s), parent company information, subsidiary company information, competitor information, customer information, vendor information, personnel information, and/or geographic information. The collection of attributes of an unknown entity extracted from one information source 110 (e.g., a single news article) are sometimes referred to as an "attribute set."

Various techniques may be employed by the extraction module 162 to detect, classify, and/or extract entity attributes from text-based data, such as rule-based named entity recognition (NER) techniques (e.g., techniques employed by General Architecture for Text Engineering (GATE) and rule based NER known as DrNER, among others) and/or machine learning-based NER techniques (e.g., techniques employed by OpenNLP Named Entity Recognizer and Name Finder, free open-source library for Natural Language Processing in Python spaCy, and named entity recognizer SemiNER, among others).

Various techniques may be employed by the extraction module 162 to detect, classify, and/or extract entity attributes from multimedia-based data (e.g., video, images), such as object recognition techniques and image recognition techniques that employ computer vision, machine learning (e.g., techniques employing support vector machines (SVM), a Bag of Features Models, Viola-Jones Algorithms, among others), and deep learning (e.g., techniques employing You Only Look Once (YOLO), single shot detector (SSD), and convolutional neural network (CNN) models) techniques.

In some aspects, the extraction module 162 can be configured to detect, classify, extract, and/or retrieve entity attributes stored in the known entities database 150. For example, the extraction module 162 can be configured to retrieve a collection of attributes for each of the known entities in the known entities database 150. Each collection of attributes of a particular known entity from the known entities database 150 is sometimes referred to as an "attribute set."

The graph generation module 164 of the entity linking system 160 can be configured to generate entity graphs based on the attribute sets that are extracted and/or retrieved by the extraction module 162. Each of the entity graphs generated by the graph generation module 164 can generally include nodes that correspond to the attributes of one of the attribute sets. For example, in one aspect, the graph generation module 164 can be configured to generate an unknown entity graph with nodes corresponding to the attributes in an attribute set of an unknown entity extracted from an information source 110. In another aspect, the graph generation module 164 can be configured to generate known entity graphs, with each of the known entity graphs each having nodes that correspond to the attributes of one of the attribute sets of the known entities retrieved from the known entities database 150.

Figure 2A:
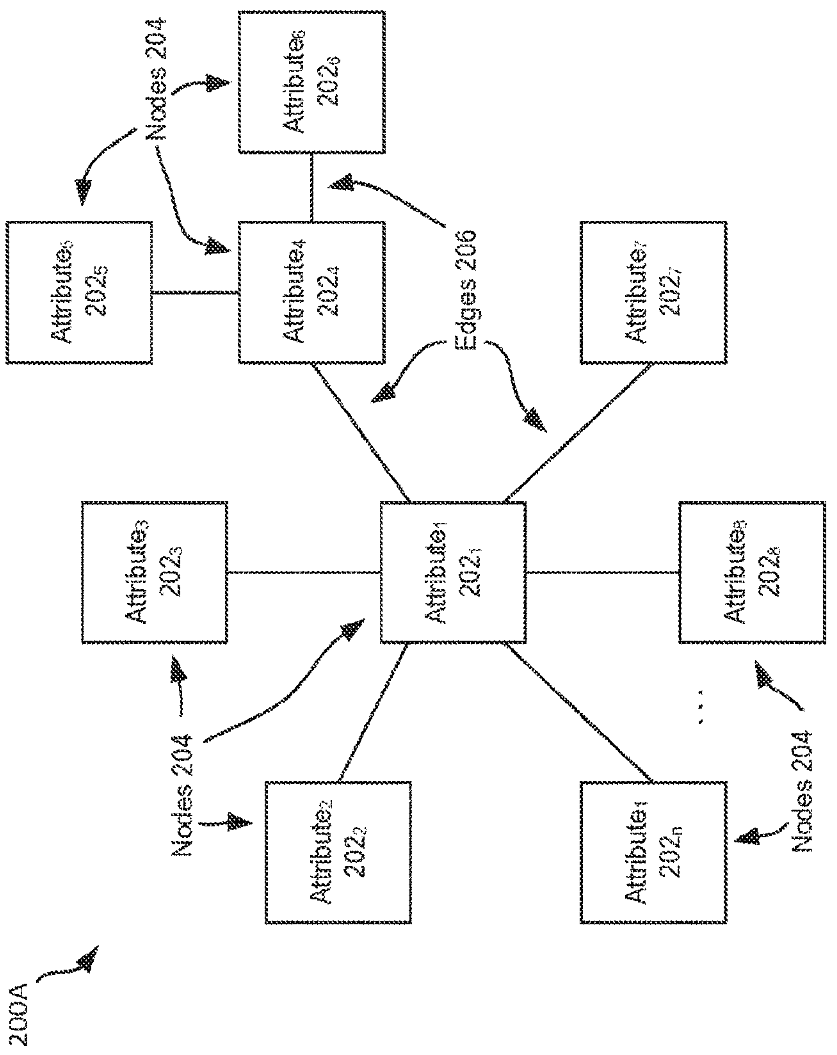
FIGS. 2A-2C are example entity graphs that can be applied to a graph neural network for entity linking using subgraph matching, according to several aspects of the present disclosure.
Figure 2B:
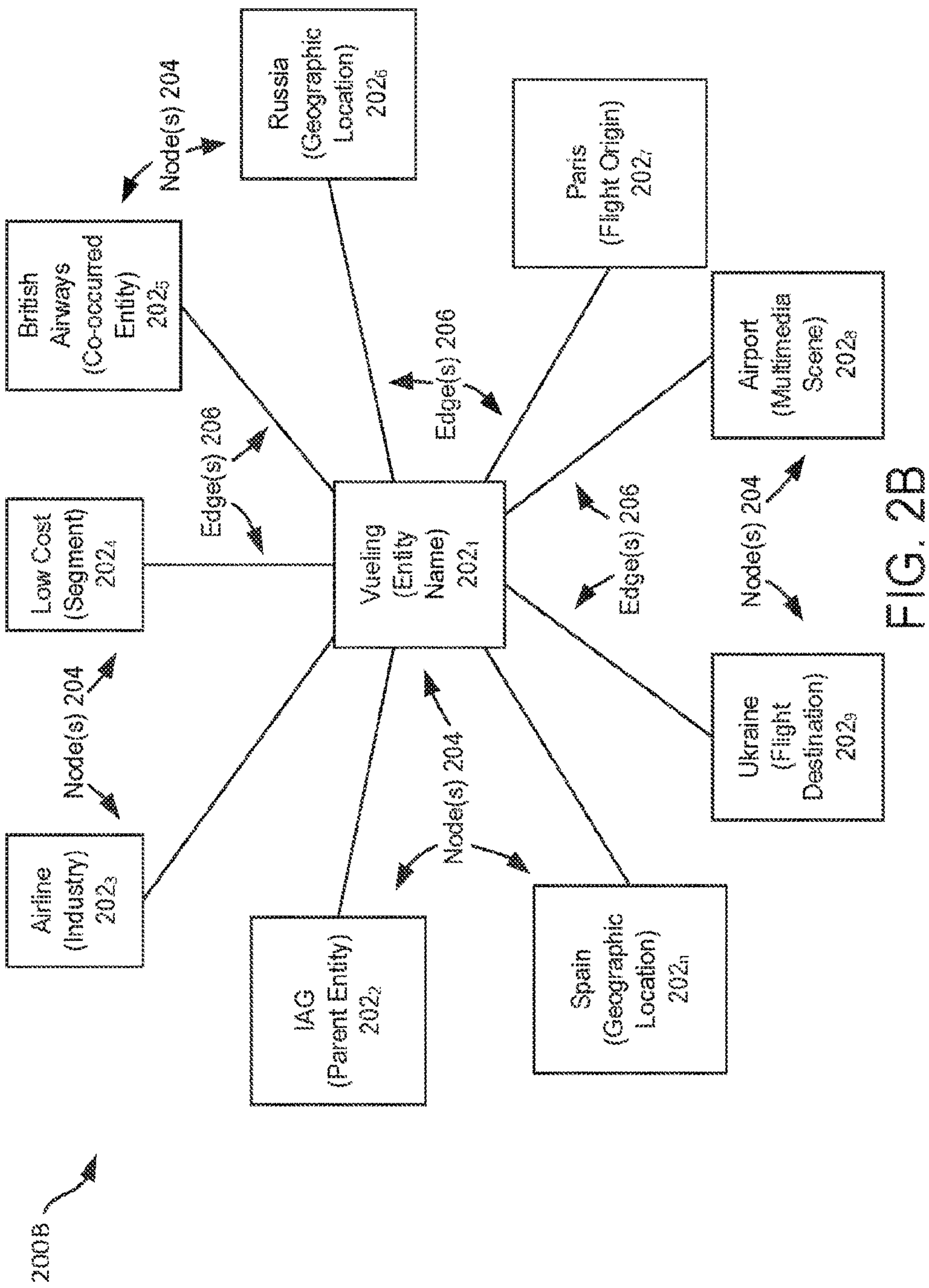
Figure 2C:
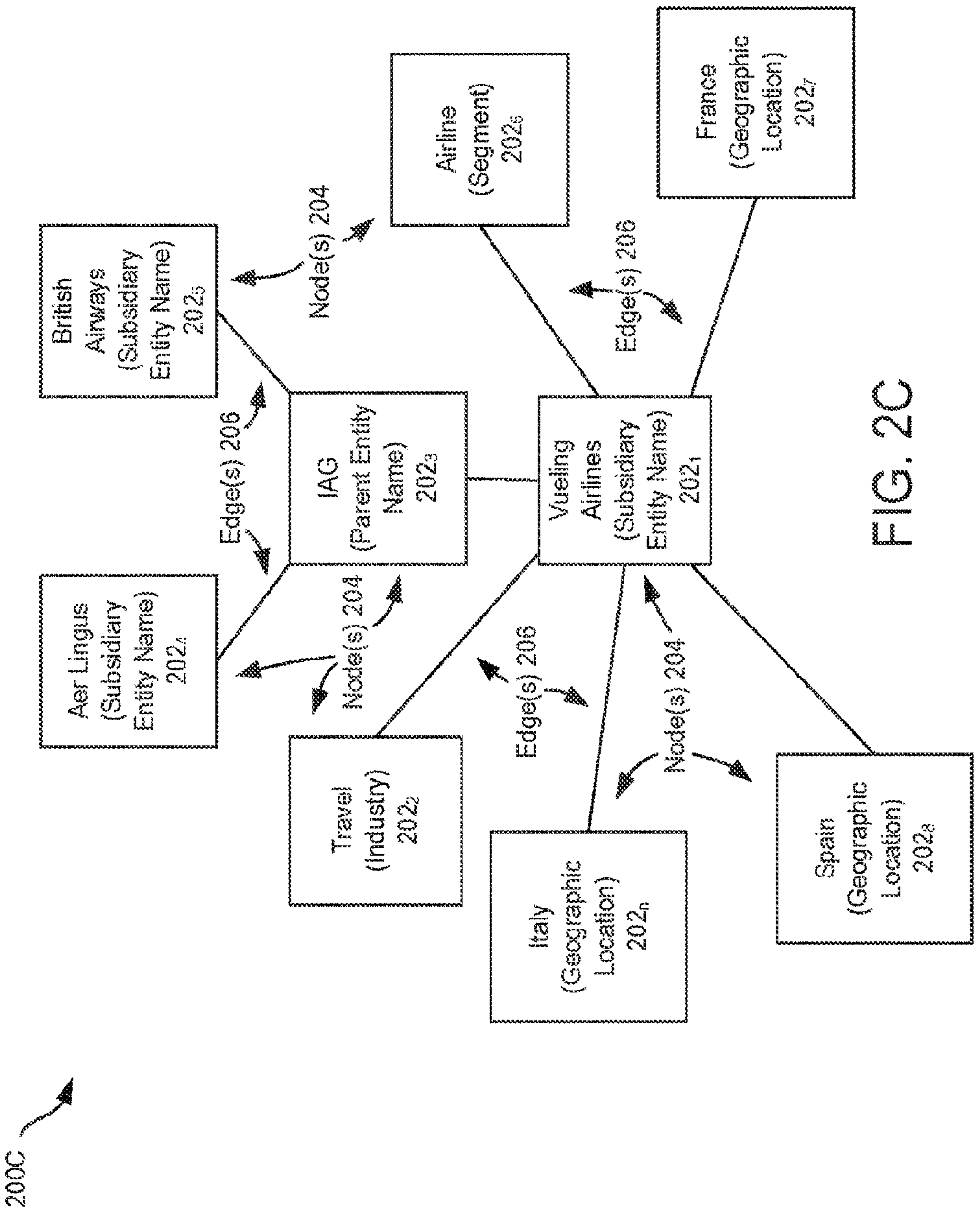

FIGS. 2A-2C are example entity graphs that may be generated by the graph generation module 164 shown in FIG. 1, according to several aspects of the present disclosure. Referring to FIG. 2A, the entity graph 200A is shown having nodes 204. Each of the nodes 204 corresponds to one of the attributes 202 from an attribute set (e.g., the attribute set comprising attribute$_1$ 202$_1$, attribute$_2$ 202$_2$, attribute$_3$ 202$_3$, attribute$_4$ 202$_4$, attribute$_5$ 202$_5$, attribute$_6$ 202$_6$, attribute$_7$ 202$_7$, attribute$_8$ 202$_8$, . . . and attribute$_n$ 202$_n$). The entity graph 200A may be an unknown entity graph or a known entity graph. Thus, attributes 202 can correspond to the attributes of an unknown entity extracted from an information source 110 or to the attributes of a known entity retrieved from the known entities database 150. Moreover, any number (e.g., any positive integer) of attributes can be included in an attribute set. Accordingly, the entity graph 200A can include any number of nodes (e.g., any positive integer).

Still referring to FIG. 2A, the structure of the entity graph 200A is determined by the placement of the edges 206. Generally, each node 204 is connected to at least one other node 204 by an edge 206. Some nodes 204 may be connected to multiple other nodes 204 via multiple edges. For example, the node 204 corresponding to attribute$_2$ 202$_2$ is only connected to the node 204 corresponding to attribute$_1$ 202$_1$ via an edge 206. Conversely, the node 204 corresponding to attribute$_1$ 202$_1$ is connected via the edges 206 to the nodes 204 corresponding to attribute$_2$ 202$_2$, attribute$_3$ 202$_3$, attribute$_4$ 202$_4$, attribute$_7$ 202$_7$, attribute$_8$ 202$_8$, and attribute$_n$ 202$_n$. Although one specific entity graph structure is depicted in the non-limiting aspect of FIG. 2A, the entity graph 200A can have any structure, with each node 204 being connected via an edge 206 to one or more of any of the other nodes 204.

Referring primarily to FIG. 2A and also to FIG. 1, in some aspects, the graph generation module 164 can be configured to determine the structure of the entity graph 200A based on the types of attributes that are included in the attribute set. In particular, the inclusion of different types of attributes in an attribute set may cause the graph generation module 164 to implement a specific organization of nodes 204 and edges 206. For example, attribute$_1$ 202$_1$ may be the name of the unknown entity. Various nodes 204 corresponding to various other attributes 202 may be connected via edges 206 to the node corresponding to attribute$_1$ 202$_1$ in a spoked configuration. As another example, attribute$_4$ 202$_4$ may be an industry of the unknown entity (e.g., airline industry). Further, attribute$_5$ 202$_5$ and attribute$_6$ 202$_6$ may be segment classifications within the industry (e.g., low-cost, regional). Thus, the nodes 204 corresponding to attribute$_5$ 202$_5$ and attribute$_6$ 202$_6$ may be connected via edges 206 to the node corresponding to attribute$_4$ 202$_4$ in a branched configuration.

Referring now primarily to FIG. 2B and also to FIG. 1, an illustrative unknown entity graph 200B is populated with attributes 202$_{1-n}$ extracted from an information source 110. In this example, the information source 110 is an online news article about Vueling, an airline company. The title of the online news article describes Vueling as a "Spanish low-cost airline" and indicates that Vueling is cancelling "Feb flights to Ukraine." The text of the article further describes Vueling as "IAG's Spanish low-cost airline" and reports that Vueling cancelled eight flights from Paris to Kyiv in light of tensions between Russia and Ukraine. The text of the article also explains that Vueling is the only Spanish airline that has a direct route from Paris "to the Ukrainian capital" and that "IAG's other airlines, which include British Airways and Iberia, do not fly to the country." Additionally, the article includes an image of travelers standing in line at an airport ticketing counter.

Still referring primarily to FIG. 2B and also to FIG. 1, based on the text and multimedia data included in the illustrative online article about Vueling, the extraction module 162 can be configured to detect, classify, and extract an attribute set that includes "Vueling" (an entity name) 202$_1$, "IAG" (a parent entity) 202$_2$, "Airline" (an industry) 202$_3$, "Low Cost" (an industry segment) 202$_4$, "British Airways" (a co-occurred entity) 202$_5$, "Russia" (geographic location) 202$_6$, "Paris" (a flight origin) 202$_7$, "Airport" (a classified multimedia scene) 202$_8$, "Ukraine" (a flight destination) 202$_9$, . . . and "Spain" (a geographic location) 202$_n$. The graph generation module 164 can be configured to generate the unknown entity graph 200B based on extracted attributes 202$_{1-n}$, wherein the unknown entity graph 200B includes nodes 204 connected by edges 206, and wherein each node 204 corresponds to one of the extracted attributes 202$_{1-n}$.

Referring now primarily to FIG. 2C and also to FIG. 1, an illustrative known entity graph 200C is populated with attributes 202$_{1-n}$ retrieved from the known entities database 150. In this example, the known entities database 150 includes attributes of the entity "Vueling Airlines." Accordingly, the extraction module 162 can be configured to detect, classify, extract, and/or retrieve an attribute set for the entity "Vueling Airlines" that includes "Vueling Airlines" (a subsidiary entity name) 202$_1$, "Travel" (an industry) 202$_2$, "IAG" (a parent entity name) 202$_3$, "Aer Lingus" (a subsidiary entity name) 202$_4$, "British Airways" (a subsidiary entity name) 202$_5$, "Airline" (an industry segment) 202$_6$, "France" (a geographic location) 202$_7$, "Spain" (a geographic location) 202$_8$, . . . and "Italy" (a geographic location) 202$_n$. The graph generation module 164 can be configured to generate the known entity graph 200C based on the retrieved attributes 202, wherein the known entity graph 200C includes nodes 204 connected by edges 206, and wherein each node corresponds to one of the extracted attributes 202.

Figure 3:
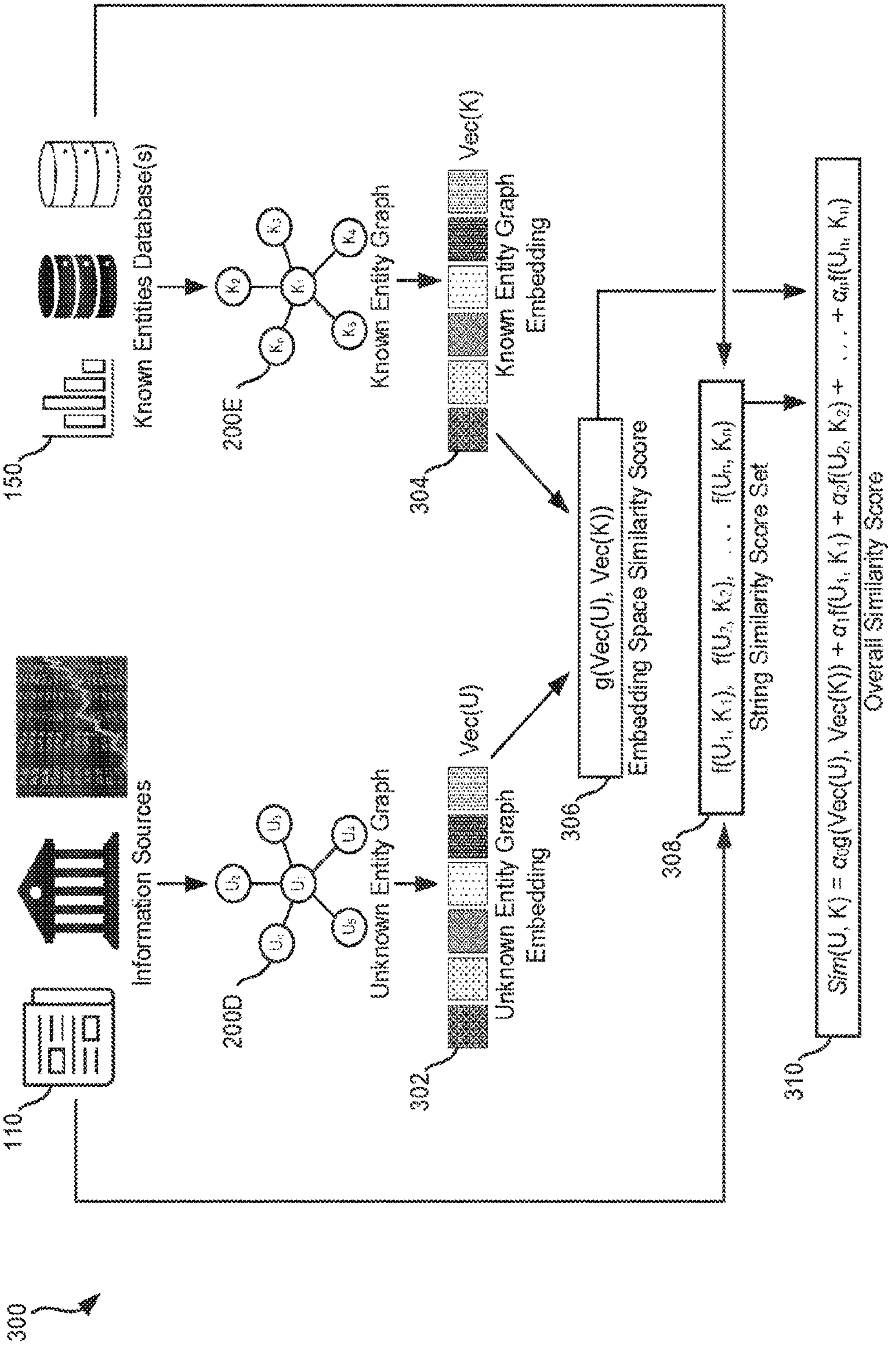
FIG. 3 is a flowchart of a method for entity linking that can be carried out by the entity linking system of FIG. 1, according to at least one aspect of the present disclosure.

Referring again to FIG. 1, various combinations of the GNN 166, the embedding similarity module 168, the string similarity module 170, and the recommendation module 172 of the entity linking system 160 can be configured to perform entity linking based on the unknown entity graph and the known entity graph(s) generated by the graph generation module 164. To illustrate this feature, FIG. 3 provides a flow diagram 300 of a method for entity linking that can be carried out by the entity linking system 160 of FIG. 1, according to at least one aspect of the present disclosure. Although the flow diagram 300 depicts a method for entity linking based on the attribute set of an unknown entity and the attribute set of a single known entity, persons of ordinary skill in the art will understand that the method for entity linking is carried out by comparing the attribute set of the unknown entity to the attribute sets of multiple known entities (e.g., by repeating the method depicted by the flow diagram 300 for multiple known entities).

Referring primarily to FIG. 3 and also to FIG. 1, the flow diagram 300 depicts an unknown entity graph 200D generated by the graph generation module 164 and a known entity graph 200E generated by the graph generation module 164. The unknown entity graph 200D can be similar to the entity graph 200A and/or the unknown entity graph 200B. Thus, the unknown entity graph 200D can include nodes corresponding to attributes (e.g., $U_1$, $U_2$, $U_3$, $U_4$, $U_5$, . . . $U_n$) of an unknown entity (e.g., U) extracted by the extraction module 162 from one of the information sources 110. Likewise, the known entity graph 200E can be similar to the entity graph 200A and/or the known entity graph 200C. Thus, the known entity graph 200E can include nodes corresponding to attributes (e.g., $K_1$, $K_2$, $K_3$, $K_4$, $K_5$, . . . $K_n$) of a known entity (e.g., K) retrieved by the extraction module 162 from the known entities database(s) 150.

Still referring to FIG. 1 and FIG. 3, the GNN 166 can be configured to generate an unknown entity graph embedding 302 (e.g., Vec(U)) based on the unknown entity graph 200D and a known entity graph embedding 304 (e.g., Vec(K)) based on the known entity graph 200E. Further, as explained in detail below, the GNN 166 can be trained such that an unknown entity graph embedding 302 and a known entity graph embedding 304 generated from entity graphs comprising attributes of the same entity will have a similar representation in the embedding space. The GNN 166 can be any type of GNN, such as a graph convolutional network (GCN).

Still referring to FIG. 1 and FIG. 3, the embedding similarity module 168 can be configured to generate an embedding space similarity score 306 (e.g., g(Vec(U), Vec (K))) based on the unknown graph embedding 302 and the known entity graph embedding 304. Various techniques can be employed by the embedding similarity module 168 to generate the embedding space similarity score 306. For example, the embedding similarity module 168 can be a deep neural network (DNN) model, such as a multi-layer DNN. As explained in detail below, the DNN can be trained to generate an embedding space similarity score 306 that corresponds to how similar the attribute set of the unknown entity and the attribute set of the known entity are to each other (based on the similarity of the graph embedding 302 and the known entity graph embedding 304). Further, as described above, the method depicted by the flow diagram 300 can be repeated for multiple known entities. Thus, multiple known entity graphs 200E, multiple known entity graph embeddings 304, and multiple embedding space similarity scores 306 can be generated, wherein each of the embedding space similarity scores 306 is based on the unknown entity graph embedding 302 and one of the known entity graph embeddings 304.

In some aspects, the embedding similarity module 168 can be configured to assign the information source 110 from which the attributes of the unknown entity were extracted (e.g., an online news article) to one of the known entities based on the embedding space similarity scores 306. For example, in one aspect, the embedding similarity module 168 can assign the information source 110 to one of the known entities based on the unknown entity graph embedding 302/known entity graph embedding 304 pair with the highest embedding space similarity score 306. In addition to or in lieu of the above, the embedding similarity module 168 can assign the information source 110 to one of the known entities if the corresponding unknown entity graph embedding 302/known entity graph embedding 304 pair has an embedding space similarity score 306 that satisfies a predetermined threshold, such as an embedding space similarity score 306 of no less than 0.7, 0.8, 0.85, 0.9, 0.95, 0.96, 0.97, 0.98, or no less than 0.99. If none of the embedding space similarity scores 306 satisfy the predetermined threshold, then the embedding similarity module 168 may not assign the information source 110 to any of the known entities.

In other aspects, the recommendation module 172 of the entity linking system 160 can be configured to determine overall similarity scores 310. Further, the recommendation module 172 can be configured to assign the information source 110 from which the attributes of the unknown entity were extracted (e.g., an online news article) to one of the known entities based on the overall similarity scores 310. Each of the overall similarity scores 310 may be based on one of the embedding space similarity scores 306 as well as other metric(s), such as a string similarity score set 308, as explained further below.

Still referring to FIG. 1 and FIG. 3, and returning to the non-limiting aspect of FIG. 3 wherein the attribute set of an unknown entity is being compared to the attribute set of a single known entity, the string similarity module 170 can be configured to generate a string similarity score set 308 (e.g., $f(U_1, K_1)$, $f(U_2, K_2)$, . . . $f(U_n, K_n)$) based on the attribute set of the unknown entity and the attribute set of the known entity. To generate the string similarity score set 308, the string similarity module 170 can be configured to identify attribute pairs (e.g., $(U_1, K_1)$, $(U_2, K_2)$, . . . $(U_n, K_n)$), wherein each of the attribute pairs includes one of the attributes of the unknown entity and one of the attributes of the known entity.

In some aspects, the string similarity module 170 can identify attribute pairs based on the type of attributes included in the attribute set of the unknown entity and the type of attributes included in the attribute set of the known entity. For example, the attribute set of the unknown entity may include an attribute for an entity name (e.g., $U_1$) and the attribute set of the known entity may include an attribute for an entity name (e.g., $K_1$). Thus, attributes $U_1$ and $K_1$ may be identified as an attribute pair. As another example, the attribute set of the unknown entity may include an attribute for an industry classification (e.g., $U_2$) and the attribute set of the known entity may include an attribute for an industry classification (e.g., $K_2$). Thus, attributes $U_2$ and $K_2$ may be identified as an attribute pair.

Each of the attributes of the known entity and each of the attributes of the unknown entity may include one or more than one word. Thus, based on the word(s) included in each attribute pair, the string similarity module 170 can be configured to generate a string similarity score (e.g., Hamming distance, Jaro-Winkler distance). The collection of attribute pairs that correspond to an attribute set of an unknown entity and an attribute set of a particular known entity is sometimes referred to herein as an "attribute pair set." Likewise, the collection of string similarity scores that correspond to a particular attribute pair set is sometimes referred to herein as "string similarity score set" (e.g. string similarity score set 308).

Still referring to FIG. 1 and FIG. 3, the recommendation module 172 can be configured to determine an overall similarity score 310 (e.g., Sim(U, K)) based on the embedding space similarity score 306 and the string similarity score set 308. The recommendation module 172 can employ various techniques to determine the overall similarity score 310. For example, the recommendation module 172 can employ a regression model and/or a classification model configured to calculate the overall similarity score 310 based on trained parameters corresponding to the embedding space similarity score 306 (e.g., parameter $a_0$) and each of the string similarity scores in the string similarity score set 308 (e.g., parameters $a_1, a_2, \ldots a_n$). Thus, the overall similarity score 310 can be calculated based on the following equation:

$$Sim(U, K) = \alpha_0 g(Vec(U), Vec(K)) + \alpha_1 f(U_1, K_1) + \alpha_2 f(U_2, K_2) + \ldots + \alpha_n f(U_n, K_n)$$

As explained in detail below, the parameters (e.g., $a_0$, $a_1$, $a_2, \ldots a_n$) of the regression model and/or the classification model employed by the recommendation module 172 can be trained such that the overall similarity score 310 corresponds to how similar the attribute set of the unknown entity and the attribute set of the known entity are to each other (based on the embedding space similarity score 306 and based on the string similarity score set 308).

As described above, the method depicted by the flow diagram 300 can be repeated for multiple known entities. Thus, multiple embedding space similarity scores 306, multiple string similarity score sets 308, and multiple overall similarity scores 310 can be generated, wherein each of the overall similarity scores 310 is based on the attributes of the unknown entity and the attributes of one of the known entities. Thus, as also described above, the recommendation module 172 can be configured to assign the information source 110 from which the attributes of the unknown entity were extracted (e.g., an online news article) to one of the known entities based on the overall similarity scores 310. For example, in one aspect, the recommendation module 172 can assign the information source 110 to the known entity that corresponds to the highest overall similarity score 306. In addition to or in lieu of the above, the recommendation module 172 can assign the information source 110 to one of the known entities if it has a corresponding overall similarity score 306 that satisfies a predetermined threshold, such as an overall similarity score 310 of no less than 0.7, 0.8, 0.85, 0.9, 0.95, 0.96, 0.97, 0.98, or no less than 0.99. If none of the overall similarity scores 310 satisfy the predetermined threshold, then the recommendation module 172 may not assign the information source 110 to any of the known entities.

Accordingly, as can be appreciated from various aspects of the present disclosure, the entity linking system 160 can be configured to perform entity linking based on the embedding space similarity scores 306 without needing to generate string similarity score sets 308. In other aspects, the entity linking system 160 can be configured to perform entity linking based on both the embedding space similarity scores 306 and the string similarity score sets 308 by determining overall similarity scores 310. Both of these approaches can provide various technological benefits. For example, both approaches are able to link an information source (e.g., an online news article) to a particular entity, accurately, efficiently, and in a non-routine way by: generating an unknown entity graph comprising nodes corresponding to attributes of the unknown entity; generating known entity graphs, wherein each of the known entity graphs comprises nodes corresponding to attributes of one of the known entities; generating an unknown entity graph embedding by applying the unknown entity graph to a graph neural network; generating known entity graph embeddings by applying each of the known entity graphs to the graph neural network; and generating embedding spaces similarity scores, wherein each of the embedding space similarity scores is based on the unknown entity graph embedding and one of the known entity graph embeddings. The latter approach can provide a non-routine and robust method for entity linking by additionally: identifying attribute pairs sets; generating string similarity score sets corresponding to the attribute pair sets; and determining overall similarity scores based on the embedding space similarity scores and the string similarity score sets.

Referring again to FIG. 1, various techniques can be used to train the GNN 166, the embedding similarity module 168 (e.g., the DNN), and/or the recommendation module 172 (e.g., a regression model, a classification model, etc.). In some aspects, training the GNN 166 can include initializing the nodes of the unknown entity graph embedding and the nodes of the known entity graph embeddings using various NLP models. Accordingly, the entity linking system 160 can include an NLP module 174 configured to perform this embedding initialization. For example, the NLP module 140 may employ an NLP model such as Bidirectional Encoder Representations from Transformers (BERT).

Referring still to FIG. 1 and various techniques that can be used to train the GNN 166, the embedding similarity module 168, and/or the recommendation module 172, in some aspects, the entity linking system 160 can include a training module 176 to train various parameters of these modules and/or neural networks using labeled data. For example, the GNN 166 can be a GCN. The training module 176 can be configured to train the parameters (e.g., kernels) of the GCN based on labeled data (e.g., entity graphs labeled to particular known entities). As another example, the embedding similarity module 168 can employ a DNN. The training module 176 can be configured to train the parameters (e.g., weights of the various layers) of the DNN based on labeled data. As yet another example, the recommendation module 172 can employ a regression model and/or a classification model. The training module 176 can be configured to train the parameters of the regression model and/or the classification model based on labeled data. In some aspects, the training module 176 can be used to train the parameters of the GNN 166, the embedding similarity module 168, and the recommendation module 172 end-to-end (e.g., simultaneously based on attribute sets labeled to particular known entities). In other aspects, the training module 176 can be used to train any of the GNN 166, the embedding similarity module 168, and/or the recommendation module 172 in separate phases.

Figure 4A:
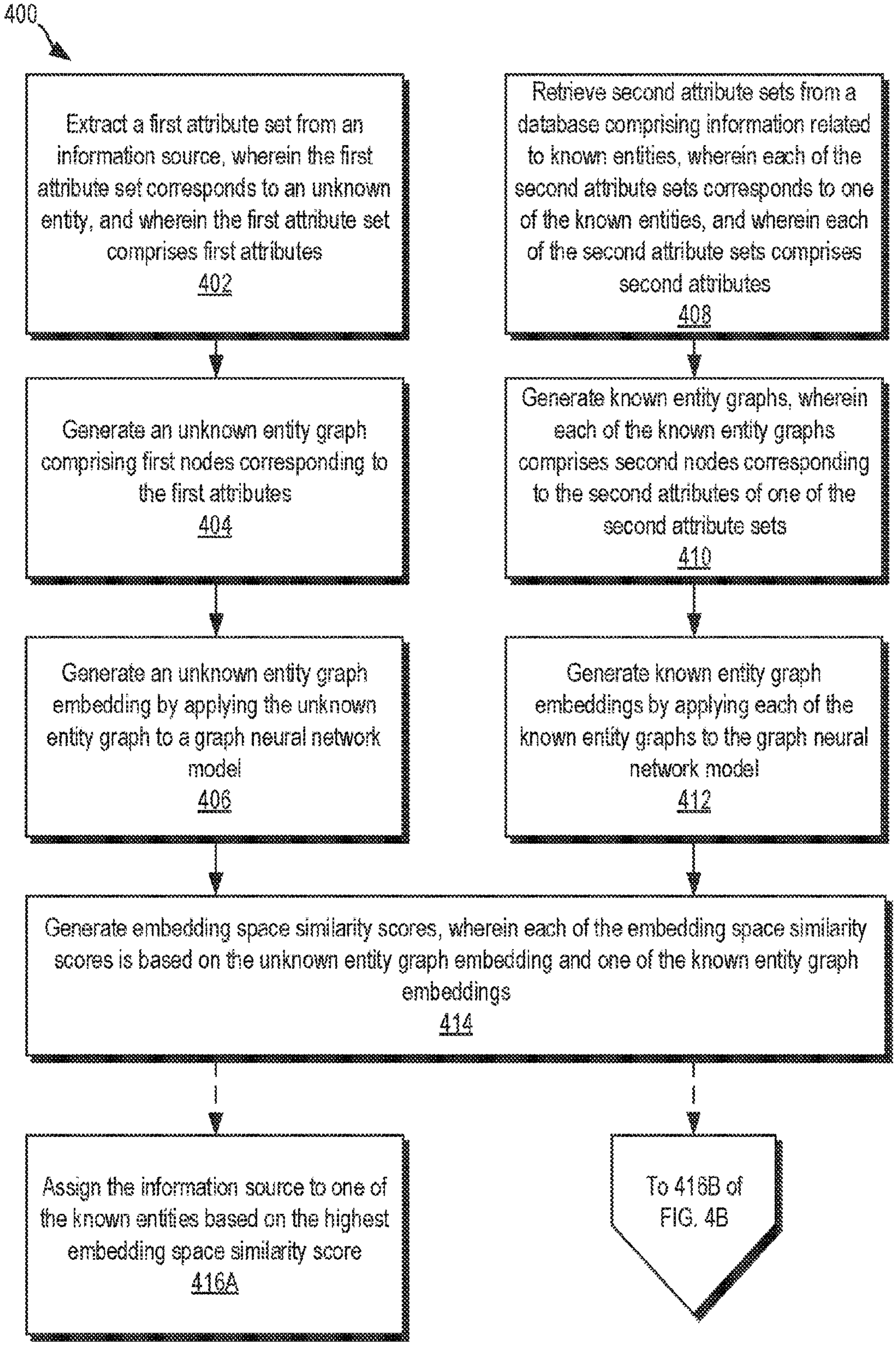
FIGS. 4A-4B is a logic flow diagram of a method for entity linking using subgraph matching, according to several aspects of the present disclosure.
Figure 4B:
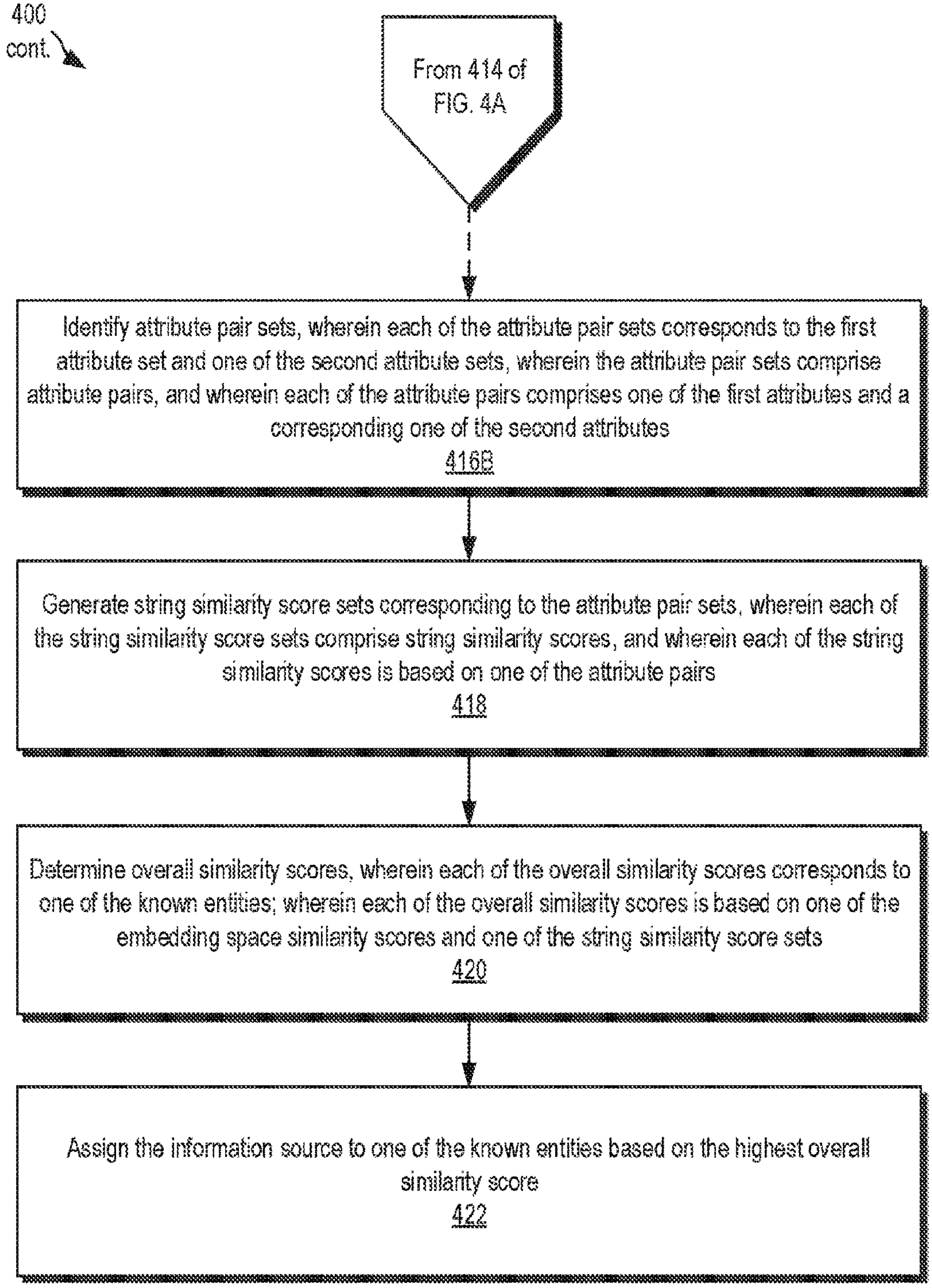

FIGS. 4A-4B illustrate a logic flow diagram of a method 400 for entity linking using subgraph matching, according to several aspects of the present disclosure. The method 400 may be practiced by the entity linking system 160 described above with respect to FIG. 1 and/or any combination of the components of entity linking system 160. Referring now to FIGS. 1, 3, and 4A, according to the method 400, the extraction module 162 extracts 402 a first attribute set from an information source 110. The first attribute set corresponds to an unknown entity and comprises first attributes. Further, the graph generation module 164 generates 404 an unknown entity graph, such as the unknown entity graph 200D. The unknown entity graph 200D comprises first nodes that correspond to the first attributes. The GNN 166 generates 406 an unknown entity graph embedding 302 by applying the unknown entity graph 200D to a graph neural network.

Still referring to FIGS. 1, 3, and 4A, according to the method 400, the extraction module 162 retrieves 408 second attribute sets from one database of the known entities database(s) 150 comprising information related to a known entity. Each of the second attribute sets corresponds to one of the known entities and comprises second attributes. Further, the graph generation module 164 generates 410 known entity graphs 200E. Each of the known entity graphs 200E comprises second nodes that correspond to the second attributes of one of the second attribute sets. The GNN 166 generates 412 known entity graph embeddings 304 by applying the known entity graphs 200E to the graph neural network.

Still referring to FIGS. 1, 3, and 4A, according to the method 400, the embedding similarity module 168 generates 414 embedding space similarity scores 306. Each of the embedding space similarity scores 306 is based on the unknown entity graph embedding 320 and one of the known entity graph embeddings 304. In one aspect of the method 400, the embedding space similarity scores 306 comprise a highest embedding space similarity score. The recommendation module 172 assigns 416A the information source 110 to one of the known entities based on the highest embedding space similarity score.

Referring now to FIGS. 1, 3, and 4B, according to another aspect of the method 400, attribute pair sets are identified 416B. Each of the attribute pair sets corresponds to the first attribute set and one of the second attribute sets. Further, each of the attribute pair sets comprises attribute pairs and each of the attribute pairs comprises one of the first attributes and a corresponding one of the second attributes. The string similarity module 170 generates 418 string similarity score sets 308 corresponding to the attribute pair sets. Each of the string similarity score sets 308 comprises string similarity scores. Each of the string similarity scores is based on one of the attribute pairs. The recommendation module 172 determines 420 overall similarity scores 310. Each of the overall similarity scores 310 corresponds to one of the known entities and is based on one of the embedding space similarity scores 306 and one of the string similarity score sets 308. Further, the overall similarity scores 310 comprise a highest overall similarity score. In this aspect of the method 400, the recommendation module 172 assigns 422 the information source 110 to one of the known entities based on the highest overall string similarity score.

Figure 5:
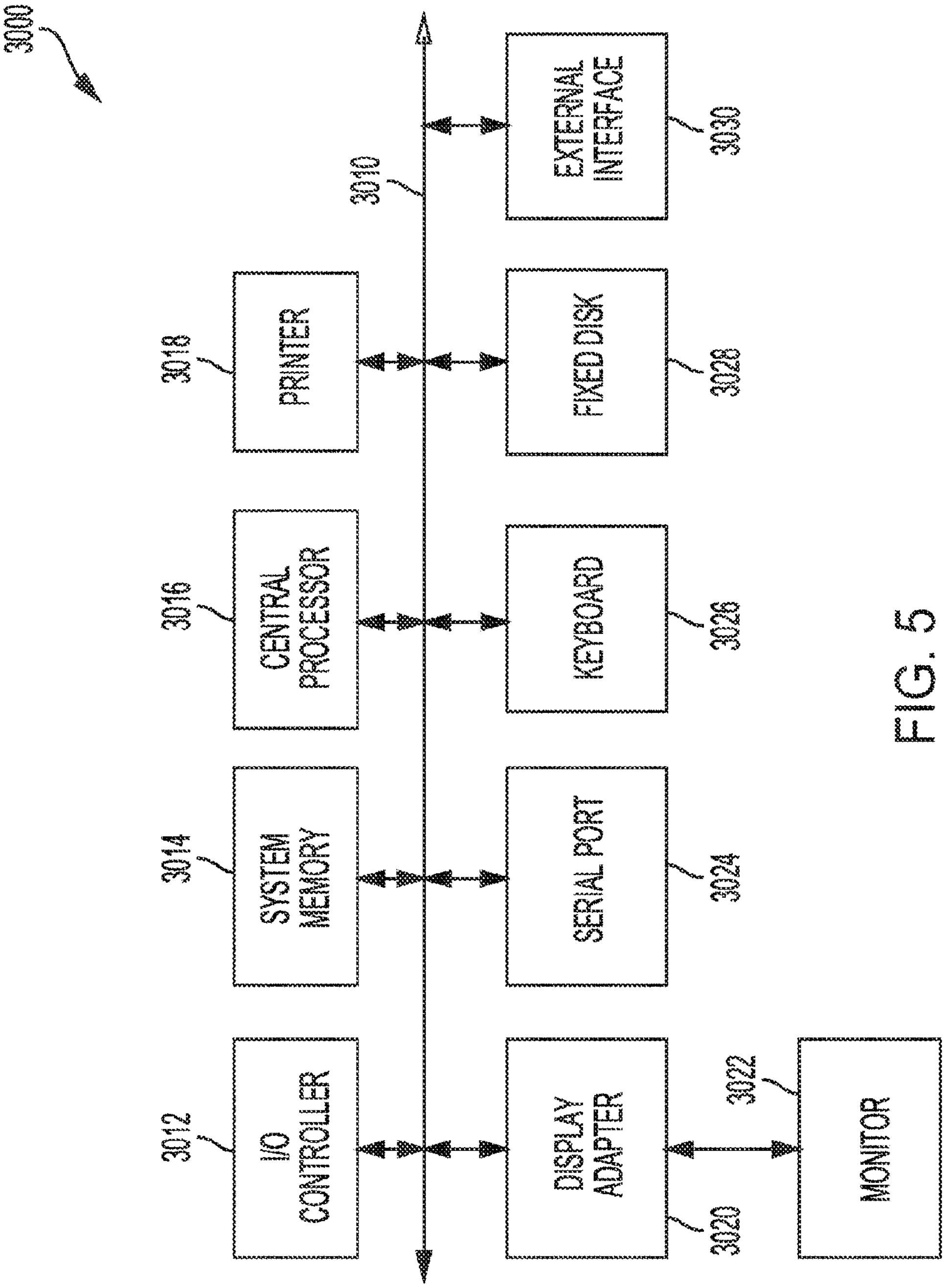
FIG. 5 shows a block diagram of a computer apparatus, according to at least one aspect of the present disclosure.

The system and modules described herein with reference to FIG. 1 may operate on one or more computer apparatuses to facilitate the functions described herein. Further, the one or more computer apparatuses may use any suitable number of subsystems to facilitate the functions described herein. For example, FIG. 5 is a block diagram of a computer apparatus 3000 with data processing subsystems or components, according to at least one aspect of the present disclosure. The subsystems shown in FIG. 5 are interconnected via a system bus 3010. Additional subsystems such as a printer 3018, keyboard 3026, fixed disk 3028 (or other memory comprising computer readable media), monitor 3022, which is coupled to a display adapter 3020, and others are shown. Peripherals and input/output (I/O) devices, which couple to an I/O controller 3012 (which can be a processor or other suitable controller), can be connected to the computer system by any number of means known in the art, such as a serial port 3024. For example, the serial port 3024 or external interface 3030 can be used to connect the computer apparatus to a wide area network such as the Internet, a mouse input device, or a scanner. The interconnection via system bus allows the central processor 3016 to communicate with each subsystem and to control the execution of instructions from system memory 3014 or the fixed disk 3028, as well as the exchange of information between subsystems. The system memory 3014 and/or the fixed disk 3028 may embody a computer readable medium.

Figure 6:
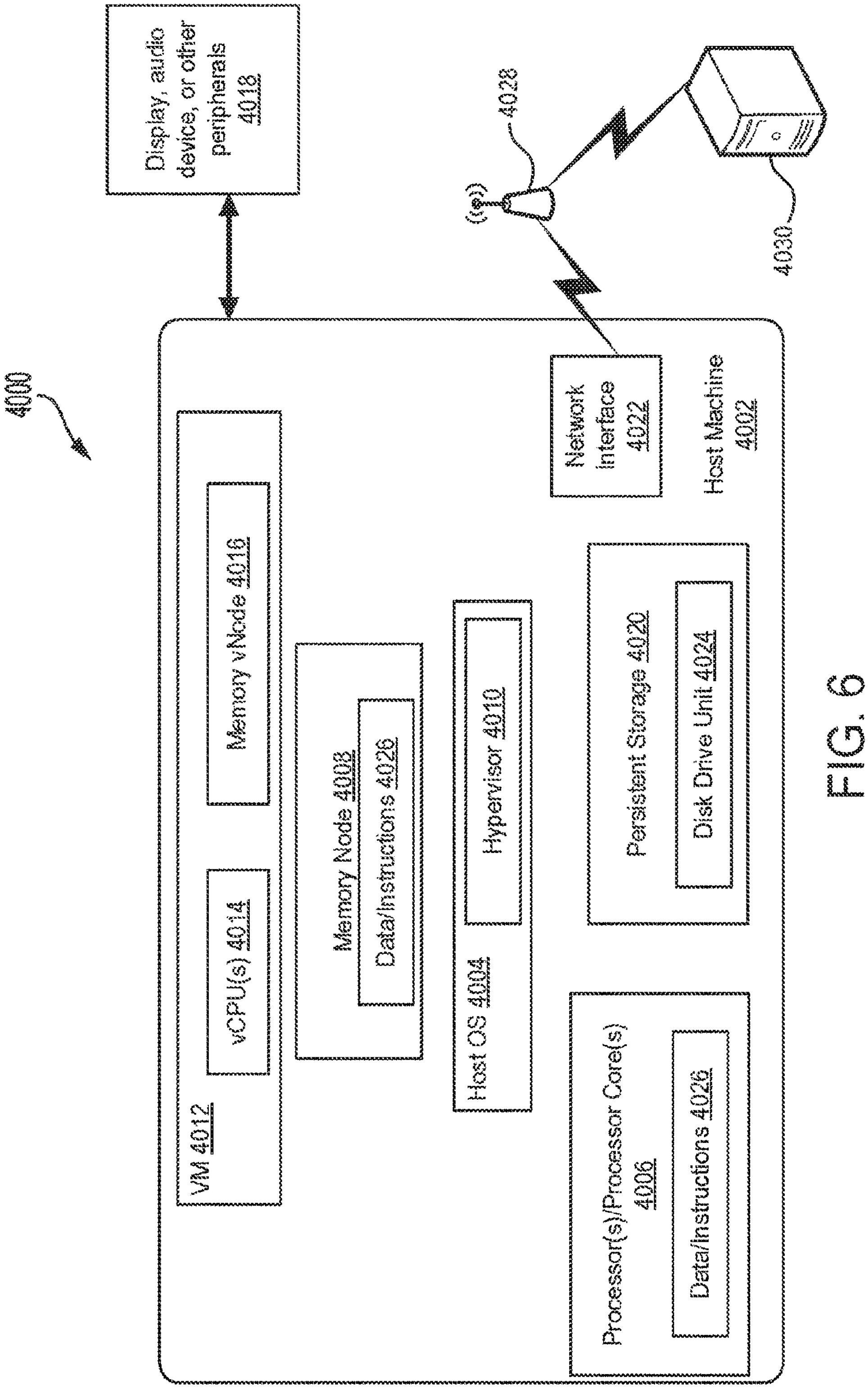
FIG. 6 shows a block diagram of a system including a host machine, according to at least one aspect of the present disclosure.

FIG. 6 is a diagrammatic representation of an example system 4000 that includes a host machine 4002 within which a set of instructions to perform any one or more of the methodologies discussed herein may be executed, according to at least one aspect of the present disclosure. In various aspects, the host machine 4002 operates as a standalone device or may be connected (e.g., networked) to other machines. In a networked deployment, the host machine 4002 may operate in the capacity of a server or a client machine in a server-client network environment, or as a peer machine in a peer-to-peer (or distributed) network environment. The host machine 3002 may be a computer or computing device, a personal computer (PC), a tablet PC, a set-top box (STB), a personal digital assistant (PDA), a cellular telephone, a portable music player (e.g., a portable hard drive audio device such as a Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example system 4000 includes the host machine 4002, running a host operating system 4004 (OS) on a processor or multiple processor(s)/processor core(s) 4006 (e.g., a central processing unit (CPU), a graphics processing unit (GPU), or both), and various memory nodes of the main memory node 4008. The host OS 4004 may include a hypervisor 4010 which is able to control the functions and/or communicate with a virtual machine ("VM") 4012 running on machine readable media. The VM 4012 also may include a virtual CPU or vCPU 4014. The memory nodes 4008 may be linked or pinned to virtual memory nodes or vNodes 4016. When the memory node 4008 is linked or pinned to a corresponding vNode 4016, then data may be mapped directly from the memory nodes 4008 to their corresponding vNodes 4016.

All the various components shown in host machine 4002 may be connected with and to each other, or communicate to each other via a bus (not shown) or via other coupling or communication channels or mechanisms. The host machine 4002 may further include a video display, audio device or other peripherals 4018 (e.g., a liquid crystal display (LCD), alpha-numeric input device(s) including, e.g., a keyboard, a cursor control device, e.g., a mouse, a voice recognition or biometric verification unit, an external drive, a signal generation device, e.g., a speaker,) a persistent storage device 4020 (also referred to as disk drive unit), and a network interface device 4022. The host machine 4002 may further include a data encryption module (not shown) to encrypt data. The components provided in the host machine 4002 are those typically found in computer systems that may be suitable for use with aspects of the present disclosure and are intended to represent a broad category of such computer components that are known in the art. Thus, the system 4000 can be a server, minicomputer, mainframe computer, or any other computer system. The computer may also include different bus configurations, networked platforms, multi-processor platforms, and the like. Various operating systems may be used including UNIX, LINUX, WINDOWS, QNX ANDROID, IOS, CHROME, TIZEN, and other suitable operating systems.

The disk drive unit 4024 also may be a Solid-state Drive (SSD), a hard disk drive (HDD) or other includes a computer or machine-readable medium on which is stored one or more sets of instructions and data structures (e.g., data/instructions 4026) embodying or utilizing any one or more of the methodologies or functions described herein. The data/instructions 4026 also may reside, completely or at least partially, within the main memory node 4008 and/or within the processor(s) 4006 during execution thereof by the host machine 4002. The data/instructions 4026 may further be transmitted or received over a network 4028 via the network interface device 4022 utilizing any one of several well-known transfer protocols (e.g., Hyper Text Transfer Protocol (HTTP)).

The processor(s) 4006 and memory nodes 4008 also may comprise machine-readable media. The term "computer-readable medium" or "machine-readable medium" should be taken to include a single medium or multiple medium (e.g., a centralized or distributed database and/or associated caches and servers) that store the one or more sets of instructions. The term "computer-readable medium" shall also be taken to include any medium that is capable of storing, encoding, or carrying a set of instructions for execution by the host machine 4002 and that causes the host machine 4002 to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example aspects described herein may be implemented in an operating environment comprising software installed on a computer, in hardware, or in a combination of software and hardware.

One skilled in the art will recognize that Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized to implement any of the various aspects of the disclosure as described herein.

The computer program instructions also may be loaded onto a computer, a server, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the host machine 4002, with each server 4030 (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media, and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one aspect of a bus. Transmission media can also take the form of acoustic or light waves, such as those generated during radio frequency (RF) and infrared (IR) data communications. Common forms of computer-readable media include, for example, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASH EPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as Java, Smalltalk, C++, or the like and conventional procedural programming languages, such as the "C" programming language, Go, Python, or other programming languages, including assembly languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Examples of the methods and systems according to various aspects of the present disclosure are provided below in the following numbered clauses. An aspect of any of the method(s) and/or system(s) may include any one or more than one, and any combination of, the numbered clauses described below.

Clause 1. A computer-implemented method, comprising: extracting, by an extraction module, a first attribute set from an information source, wherein the first attribute set corresponds to an unknown entity, and wherein the first attribute set comprises first attributes; generating, by a graph generation module, an unknown entity graph comprising first nodes corresponding to the first attributes; retrieving, by the extraction module, a second attribute set from a database comprising known entities, wherein the second attribute set corresponds to one of the known entities, and wherein the second attribute set comprises second attributes; generating, by the graph generation module, a known entity graph comprising second nodes corresponding to the second attributes; generating, by a graph neural network model, an unknown entity graph embedding by applying the unknown entity graph to the graph neural network model; generating, by the graph neural network model, a known entity graph embedding by applying the known entity graph to the graph neural network model; generating, by an embedding similarity module, an embedding space similarity score based on the unknown entity graph embedding and the known entity graph embedding; and assigning, by a recommendation module, the information source to one of the known entities based on the embedding space similarity score.

Clause 2. The method of Clause 1, wherein the graph neural network model is a graph convolutional network model.

Clause 3. The method of any one of Clauses 1-2, wherein the extracting the first attribute set from the information source comprises extracting, by the extraction module, the first attributes from at least one of a news article or a webpage.

Clause 4. The method of any one of Clauses 1-3, wherein the extracting the first attribute set from the information source comprises extracting, by the extraction module, at least one of: a name of the unknown entity; an industry associated with the unknown entity; geographic information related to the unknown entity; a name of an entity that is not the unknown entity; a classification of an image associated with the unknown entity; or a classification of a video associated with the unknown entity.

Clause 5. The method of any one of Clauses 1-4, wherein the retrieving the second attribute set from the database comprises retrieving, by the extraction module, at least one of: a name of one of the known entities; an industry associated with one of the known entities; geographic information related to one of the known entities; a name of a parent entity of one of the known entities; a name of a subsidiary entity of one of the known entities; or a name of an entity known to transact business with one of the known entities.

Clause 6. The method of any one of Clauses 1-5, wherein the generating the embedding space similarity score comprises: applying, by the embedding similarity module, the unknown entity graph embedding and the known entity graph embedding to a deep neural network model.

Clause 7. A computer-implemented method, comprising: extracting, by an extraction module, a first attribute set from an information source, wherein the first attribute set corresponds to an unknown entity, and wherein the first attribute set comprises first attributes; generating, by a graph generation module, an unknown entity graph comprising first nodes corresponding to the first attributes; retrieving, by the extraction module, a second attribute set from a database comprising known entities, wherein the second attribute set corresponds to one of the known entities, and wherein the second attribute set comprises second attributes; generating, by the graph generation module, a known entity graph comprising second nodes corresponding to the second attributes; generating, by a graph neural network model, an unknown entity graph embedding by applying the unknown entity graph to the graph neural network model; generating, by the graph neural network model, a known entity graph embedding by applying the known entity graph to the graph neural network model; generating, by an embedding similarity module, an embedding space similarity score based on the unknown entity graph embedding and the known entity graph embedding; determining, by a recommendation module, an overall similarity score based on the embedding space similarity score; and assigning, by the recommendation module, the information source to one of the known entities based on the overall similarity score.

Clause 8. The method of Clause 7, wherein each of the first attributes comprises at least one word, and wherein each of the second attributes comprises at least one word, the method further comprising: identifying, by a string similarity module, attribute pairs, wherein each of the attribute pairs comprises one of the first attributes and a corresponding one of the second attributes; and generating, by the string similarity module, string similarity scores, wherein each of the string similarity scores is based on one of the attribute pairs, and wherein the overall similarity scores is further based on the string similarity scores.

Clause 9. The method of any one of Clauses 7-8, wherein the determining the overall similarity score comprises: applying, by the recommendation module, the embedding space similarity score and the string similarity scores to at least one of a regression model or a classification model.

Clause 10. The method of any one of Clauses 7-9, wherein the generating the embedding space similarity score comprises: applying, by the embedding similarity module, the unknown entity graph embedding and the known entity graph embedding to a deep neural network model.

Clause 11. The method of any one of Clauses 7-10, further comprising: training, by a training module, the graph neural network model, the deep neural network model, and the at least one of the regression model or the classification model end-to-end based on labeled data.

Clause 12. The method of any one of Clauses 7-11, wherein the graph neural network model is a graph convolutional network model.

Clause 13. The method of any one of Clauses 7-12, wherein the extracting the first attribute set from the information source comprises extracting the first attributes from at least one of a news article or a webpage.

Clause 14. The method of any one of Clauses 7-13, wherein the extracting the first attribute set from the information source comprises extracting at least one of: a name of the unknown entity; an industry associated with the unknown entity; geographic information related to the unknown entity; a name of an entity that is not the unknown entity; a classification of an image associated with the unknown entity; or a classification of a video associated with the unknown entity.

Clause 15. The method of any one of Clauses 7-14, wherein the retrieving the second attribute set from the database comprises retrieving at least one of: a name of one of the known entities; an industry associated with one of the known entities; geographic information related to one of the known entities; a name of a parent entity of one of the known entities; a name of a subsidiary entity of one of the known entities; or a name of an entity known to transact business with one of the known entities.

Clause 16. An entity linking system, comprising: a graph generation module configured to generate: an unknown entity graph based on a first attribute set comprising first attributes, wherein the first attributes are extracted from an information source, wherein the first attribute set corresponds to an unknown entity and wherein the unknown entity graph comprises first nodes corresponding to the first attributes; and a known entity graph based on a second attribute set comprising second attributes, wherein the second attributes are retrieved from a database comprising known entities, wherein the second attribute set corresponds to one of the known entities, and wherein the known entity graph comprises second nodes corresponding to the second attributes; a graph neural network configured to generate: an unknown entity graph embedding based on the unknown entity graph; and a known entity graph embedding based on the known entity graph; an embedding space similarity module configured to generate an embedding space similarity score based on the unknown entity graph embedding and the known entity graph embedding; and a recommendation module configured to assign the information source to one of the known entities based on the embedding space similarity score.

Clause 17. The system of Clause 16, further comprising: a string similarity module configured to generate string similarity scores based on attribute pairs, wherein each of the attribute pairs comprises one of the first attributes and a corresponding one of the second attributes, and wherein each of the string similarity scores is based on one of the attribute pairs; and wherein the recommendation module is further configured to assign the information source to one of the known entities based on the string similarity scores and the embedding space similarity score.

Clause 18. The system of any one of Clauses 16-17, wherein the graph neural network is a graph convolutional network, wherein the embedding space similarity module comprises a deep neural network, and wherein the recommendation module comprises at least one of a regression model or a classification model.

Clause 19. The system of any one of Clauses 16-18, wherein the information source is at least one of a news article or a webpage, and wherein the first attribute set comprises at least one: a name of the unknown entity; an industry associated with the unknown entity; geographic information related to the unknown entity; a name of an entity that is not the unknown entity; a classification of an image associated with the unknown entity; or a classification of a video associated with the unknown entity.

Clause 20. The system of any one of Clauses 16-19, wherein the second attribute set comprises at least one of: a name of one of the known entities; an industry associated with one of the known entities; geographic information related to one of the known entities; a name of a parent entity of one of the known entities; a name of a subsidiary entity of one of the known entities; or a name of an entity known to transact business with one of the known entities.

Further, it is understood that any one or more of the following-described forms, expressions of forms, examples, can be combined with any one or more of the other following-described forms, expressions of forms, and examples.

Any of the software components or functions described in this application, may be implemented as software code to be executed by a processor using any suitable computer language such as, for example, Python, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

While several forms have been illustrated and described, it is not the intention of Applicant to restrict or limit the scope of the appended claims to such detail. Numerous modifications, variations, changes, substitutions, combinations, and equivalents to those forms may be implemented and will occur to those skilled in the art without departing from the scope of the present disclosure. Moreover, the structure of each element associated with the described forms can be alternatively described as a means for providing the function performed by the element. Also, where materials are disclosed for certain components, other materials may be used. It is therefore to be understood that the foregoing description and the appended claims are intended to cover all such modifications, combinations, and variations as falling within the scope of the disclosed forms. The appended claims are intended to cover all such modifications, variations, changes, substitutions, modifications, and equivalents.

The foregoing detailed description has set forth various forms of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, and/or examples can be implemented, individually and/or collectively, by a wide range of hardware, software, firmware, or virtually any combination thereof. Those skilled in the art will recognize that some aspects of the forms disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as one or more program products in a variety of forms, and that an illustrative form of the subject matter described herein applies regardless of the particular type of signal bearing medium used to actually carry out the distribution.

Instructions used to program logic to perform various disclosed aspects can be stored within a memory in the system, such as dynamic random access memory (DRAM), cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, compact disc, read-only memory (CD-ROMs), and magneto-optical disks, read-only memory (ROMs), random access memory (RAM), erasable programmable read-only memory (EPROM), electrically erasable programmable read-only memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the non-transitory computer-readable medium includes any type of tangible machine-readable medium suitable for storing or transmitting electronic instructions or information in a form readable by a machine (e.g., a computer).

As used in any aspect herein, the term "control circuit" may refer to, for example, hardwired circuitry, programmable circuitry (e.g., a computer processor including one or more individual instruction processing cores, processing unit, processor, microcontroller, microcontroller unit, controller, digital signal processor (DSP), programmable logic device (PLD), programmable logic array (PLA), or field programmable gate array (FPGA)), state machine circuitry, firmware that stores instructions executed by programmable circuitry, and any combination thereof. The control circuit may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Accordingly, as used herein "control circuit" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

As used in any aspect herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

As used in any aspect herein, the terms "component," "system," "module" and the like can refer to a computer-related entity, either hardware, a combination of hardware and software, software, or software in execution.

As used in any aspect herein, an "algorithm" refers to a self-consistent sequence of steps leading to a desired result, where a "step" refers to a manipulation of physical quantities and/or logic states which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities and/or states.

A network may include a packet switched network. The communication devices may be capable of communicating with each other using a selected packet switched network communications protocol. One example communications protocol may include an Ethernet communications protocol which may be capable of permitting communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard", published in December 2008 and/or later versions of this standard. Alternatively or additionally, the communication devices may be capable of communicating with each other using an X.25 communications protocol. The X.25 communications protocol may comply or be compatible with a standard promulgated by the International Telecommunication Union-Telecommunication Standardization Sector (ITU-T). Alternatively or additionally, the communication devices may be capable of communicating with each other using a frame relay communications protocol. The frame relay communications protocol may comply or be compatible with a standard promulgated by Consultative Committee for International Telegraph and Telephone (CCITT) and/or the American National Standards Institute (ANSI). Alternatively or additionally, the transceivers may be capable of communicating with each other using an Asynchronous Transfer Mode (ATM) communications protocol. The ATM communications protocol may comply or be compatible with an ATM standard published by the ATM Forum titled "ATM-MPLS Network Interworking 2.0" published August 2001, and/or later versions of this standard. Of course, different and/or after-developed connection-oriented network communication protocols are equally contemplated herein.

Unless specifically stated otherwise as apparent from the foregoing disclosure, it is appreciated that, throughout the foregoing disclosure, discussions using terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

One or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flow diagrams are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

The above description is illustrative and is not restrictive. Many variations of the claimed subject matter will become apparent to those skilled in the art upon review of the disclosure. The scope of the present disclosure should, therefore, be determined not with reference to the above description, but instead should be determined with reference to the pending claims along with their full scope or equivalents.

All patents, patent applications, publications, and descriptions mentioned above are herein incorporated by reference in their entirety for all purposes. None is admitted to be prior art.

What is claimed is:

1. A computer-implemented method, comprising:

extracting, by an extraction module, a first attribute set from an information source, wherein the first attribute set corresponds to an unknown entity, and wherein the first attribute set comprises first attributes;

generating, by a graph generation module, an unknown entity graph comprising first nodes corresponding to the first attributes;

retrieving, by the extraction module, a second attribute set from a database comprising known entities, wherein the second attribute set corresponds to one of the known entities, and wherein the second attribute set comprises second attributes;

generating, by the graph generation module, a known entity graph comprising second nodes corresponding to the second attributes;

generating, by a graph neural network model, an unknown entity graph embedding by applying the unknown entity graph to the graph neural network model;

generating, by the graph neural network model, a known entity graph embedding by applying the known entity graph to the graph neural network model;

generating, by an embedding similarity module, an embedding space similarity score based on the unknown entity graph embedding and the known entity graph embedding; and assigning, by a recommendation module, the information source to one of the known entities based on the embedding space similarity score.

2. The method of claim 1, wherein the graph neural network model is a graph convolutional network model.

3. The method of claim 1, wherein the extracting the first attribute set from the information source comprises extracting, by the extraction module, the first attributes from at least one of a news article or a webpage.

4. The method of claim 1, wherein the extracting the first attribute set from the information source comprises extracting, by the extraction module, at least one of:

a name of the unknown entity;

an industry associated with the unknown entity;

geographic information related to the unknown entity;

a name of an entity that is not the unknown entity;

a classification of an image associated with the unknown entity; or a classification of a video associated with the unknown entity.

5. The method of claim 1, wherein the retrieving the second attribute set from the database comprises retrieving, by the extraction module, at least one of:

a name of one of the known entities;

an industry associated with one of the known entities;

geographic information related to one of the known entities;

a name of a parent entity of one of the known entities;

a name of a subsidiary entity of one of the known entities; or a name of an entity known to transact business with one of the known entities.

6. The method of claim 1, wherein the generating the embedding space similarity score comprises:

applying, by the embedding similarity module, the unknown entity graph embedding and the known entity graph embedding to a deep neural network model.

7. A computer-implemented method, comprising:

extracting, by an extraction module, a first attribute set from an information source, wherein the first attribute set corresponds to an unknown entity, and wherein the first attribute set comprises first attributes;

generating, by a graph generation module, an unknown entity graph comprising first nodes corresponding to the first attributes;

retrieving, by the extraction module, a second attribute set from a database comprising known entities, wherein the second attribute set corresponds to one of the known entities, and wherein the second attribute set comprises second attributes;

generating, by the graph generation module, a known entity graph comprising second nodes corresponding to the second attributes;

generating, by a graph neural network model, an unknown entity graph embedding by applying the unknown entity graph to the graph neural network model;

generating, by the graph neural network model, a known entity graph embedding by applying the known entity graph to the graph neural network model;

generating, by an embedding similarity module, an embedding space similarity score based on the unknown entity graph embedding and the known entity graph embedding;

determining, by a recommendation module, an overall similarity score based on the embedding space similarity score; and assigning, by the recommendation module, the information source to one of the known entities based on the overall similarity score.

8. The method of claim 7, wherein each of the first attributes comprises at least one word, and wherein each of the second attributes comprises at least one word, the method further comprising:

identifying, by a string similarity module, attribute pairs, wherein each of the attribute pairs comprises one of the first attributes and a corresponding one of the second attributes; and generating, by the string similarity module, string similarity scores, wherein each of the string similarity scores is based on one of the attribute pairs, and wherein the overall similarity score is further based on the string similarity scores.

9. The method of claim 8, wherein the determining the overall similarity score comprises:

applying, by the recommendation module, the embedding space similarity score and the string similarity scores to at least one of a regression model or a classification model.

10. The method of claim 9, wherein the generating the embedding space similarity score comprises:

applying, by the embedding similarity module, the unknown entity graph embedding and the known entity graph embedding to a deep neural network model.

11. The method of claim 10, further comprising:

training, by a training module, the graph neural network model, the deep neural network model, and the at least one of the regression model or the classification model end-to-end based on labeled data.

12. The method of claim 7, wherein the graph neural network model is a graph convolutional network model.

13. The method of claim 7, wherein the extracting the first attribute set from the information source comprises extracting, by the extraction module, the first attributes from at least one of a news article or a webpage.

14. The method of claim 7, wherein the extracting the first attribute set from the information source comprises extracting, by the extraction module, at least one of:

a name of the unknown entity;

an industry associated with the unknown entity;

geographic information related to the unknown entity;

a name of an entity that is not the unknown entity;

a classification of an image associated with the unknown entity; or a classification of a video associated with the unknown entity.

15. The method of claim 7, wherein the retrieving the second attribute set from the database comprises retrieving, by the extraction module, at least one of:

a name of one of the known entities;

an industry associated with one of the known entities;

geographic information related to one of the known entities;

a name of a parent entity of one of the known entities;

a name of a subsidiary entity of one of the known entities; or a name of an entity known to transact business with one of the known entities.

16. An entity linking system, comprising:

a memory storing processor-executable instructions; and one or more processors configured to execute the processor-executable instructions to implement:

a graph generation module operable to generate:

an unknown entity graph based on a first attribute set comprising first attributes, wherein the first attributes are extracted from an information source, wherein the first attribute set corresponds to an unknown entity, and wherein the unknown entity graph comprises first nodes corresponding to the first attributes; and a known entity graph based on a second attribute set comprising second attributes, wherein the second attributes are retrieved from a database comprising known entities, wherein the second attribute set corresponds to one of the known entities, and wherein the known entity graph comprises second nodes corresponding to the second attributes;

a graph neural network configured to generate:

an unknown entity graph embedding based on the unknown entity graph; and a known entity graph embedding based on the known entity graph;

an embedding space similarity module configured to generate an embedding space similarity score based on the unknown entity graph embedding and the known entity graph embedding; and a recommendation module configured to assign the information source to one of the known entities based on the embedding space similarity score.

17. The entity linking system of claim 16, wherein the instructions further comprise instructions to implement:

a string similarity module configured to generate string similarity scores based on attribute pairs, wherein each of the attribute pairs comprises one of the first attributes and a corresponding one of the second attributes, and wherein each of the string similarity scores is based on one of the attribute pairs; and wherein the recommendation module is further configured to assign the information source to one of the known entities based on the string similarity scores and the embedding space similarity score.

18. The entity linking system of claim 17, wherein the graph neural network is a graph convolutional network, wherein the embedding space similarity module comprises a deep neural network, and wherein the recommendation module comprises at least one of a regression model or a classification model.

19. The entity linking system of claim 16, wherein the information source is at least one of a news article or a webpage, and wherein the first attribute set comprises at least one of:

a name of the unknown entity;

an industry associated with the unknown entity;

geographic information related to the unknown entity;

a name of an entity that is not the unknown entity;

a classification of an image associated with the unknown entity; or a classification of a video associated with the unknown entity.

20. The entity linking system of claim 16, wherein the second attribute set comprises at least one of:

a name of one of the known entities;

an industry associated with one of the known entities;

geographic information related to one of the known entities;

a name of a parent entity of one of the known entities;

a name of a subsidiary entity of one of the known entities; or a name of an entity known to transact business with one of the known entities.

* * * * *